(12) United States Patent
Chu et al.

(10) Patent No.: US 6,846,033 B2
(45) Date of Patent: Jan. 25, 2005

(54) VEHICLE DOOR SIDE INTRUSION PREVENTION ASSEMBLY

(75) Inventors: Yi-Hwa Chu, Ouzouer sur Loire (FR); Pascal De Vries, Sandillon (FR)

(73) Assignee: ArvinMeritor Light Vehicle Systems (FR)

( * ) Notice: Subject to any disclaimer, the term of this patent is extended or adjusted under 35 U.S.C. 154(b) by 0 days.

(21) Appl. No.: 10/703,141

(22) Filed: Nov. 5, 2003

(65) Prior Publication Data

US 2004/0124663 A1 Jul. 1, 2004

(30) Foreign Application Priority Data

Nov. 12, 2002 (FR) .......................................... 02 14111

(51) Int. Cl.[7] ................................................ B60J 5/04
(52) U.S. Cl. .............................. 296/146.6; 296/187.12
(58) Field of Search ...................... 296/146.6, 187.12; 49/502; 52/731.6

(56) References Cited

U.S. PATENT DOCUMENTS

| | | | |
|---|---|---|---|
| 4,901,500 A | | 2/1990 | Wycech |
| 4,978,562 A | | 12/1990 | Wycech |
| 5,123,694 A | | 6/1992 | DePierre et al. |
| 5,137,325 A | * | 8/1992 | Ohya .................... 296/187.12 |
| 5,429,410 A | * | 7/1995 | Fleischer ................ 296/146.6 |
| 5,518,290 A | * | 5/1996 | Reinhard et al. ........ 296/146.6 |
| 5,806,917 A | * | 9/1998 | Townsend .................. 296/202 |
| 5,895,088 A | * | 4/1999 | Knott .................... 296/187.12 |
| 5,908,216 A | * | 6/1999 | Townsend ................ 296/146.6 |
| 6,050,049 A | | 4/2000 | Kawalski et al. |
| 6,053,565 A | * | 4/2000 | Cho .................... 296/187.12 |
| 6,135,537 A | | 10/2000 | Giddons |
| 6,302,473 B1 | * | 10/2001 | Weber .................... 296/146.6 |
| 6,382,707 B1 | * | 5/2002 | Dunneback ............. 296/146.6 |
| 6,398,289 B1 | * | 6/2002 | Gehringhoff ............ 296/146.6 |
| 6,575,525 B2 | * | 6/2003 | Traister et al. .......... 296/146.6 |
| 6,601,910 B1 | * | 8/2003 | Duggan ................. 296/203.03 |
| 6,663,166 B2 | * | 12/2003 | Achleitner .............. 296/146.6 |
| 2002/0093219 A1 | | 7/2002 | Traister et al. |

FOREIGN PATENT DOCUMENTS

JP              4-27619        *   1/1992

OTHER PUBLICATIONS

European Search Report dated Jul. 16, 2003.

* cited by examiner

Primary Examiner—Joseph D. Pape
(74) Attorney, Agent, or Firm—Carlson, Gaskey & Olds

(57) ABSTRACT

An anti-side intrusion assembly for a vehicle door includes a reinforcing beam. Anchoring members secured to the reinforcing beam anchor the reinforcing beam to the vehicle frame or chassis. The reinforcing beam extends across the vehicle door and is anchored to the chassis at each end. One of the anchoring members a door hinge, and the other of the anchoring member is a lug generally perpendicular to the reinforcing beam. When the door is closed, the lug extends into a recess provided in a rigid portion of the door frame or chassis. Substantial bending of the reinforcing beam upon side impact on the door is prevented by bearing the lug on the rigid sidewall of the recess.

25 Claims, 1 Drawing Sheet

A-A

VEHICLE DOOR SIDE INTRUSION PREVENTION ASSEMBLY

REFERENCE TO RELATED APPLICATION

This application claims priority to French Patent Application FR 02 14 111 filed on Nov. 12, 2002.

TECHNICAL FIELD

The present invention relates generally to an anti-intrusion assembly for a vehicle door including a reinforcing beam having anchoring members to anchor the reinforcing beam to a vehicle chassis.

BACKGROUND OF THE INVENTION

Vehicle doors are fitted with assemblies that strengthen the door structure against side impacts. U.S. Pat. No. 6,135,537 discloses a vehicle door reinforcing assembly that transfers the energy of a side impact to the vehicle chassis by the door hinge. The assembly includes two anti-intrusion beams across the door. One end of the beam is connected to the door hinge, and the other end of the beam is connected to the door frame by a securing plate.

One disadvantage of this assembly is that a side impact pushes the door in at the height of the securing plate, preventing the vehicle occupants from being protected effectively.

The Renault Megane® vehicle has an anti-burst finger folded 90° in the sheet metal and secured to the vehicle body. The anti-burse finger limits intrusion of the door into the passenger compartment during a side impact. This vehicle also includes a reinforcing beam that transfers the energy from a side impact to the vehicle chassis. One disadvantage is that the reinforcing beam is pushed into the vehicle passenger compartment during a side impact and may not provide sufficient protection for the vehicle occupants.

Hence, there is a need for an assembly that provides better protection for vehicle occupants.

SUMMARY OF THE INVENTION

The present invention is directed to an anti-side intrusion assembly for a vehicle door. The anti-side intrusion assembly includes a reinforcing beam for the vehicle door and anchoring members secured to the reinforcing beam, which anchor the reinforcing beam on the vehicle chassis. The anti-side intrusion assembly also includes securing features that secure the reinforcing beam to the door. Preferably, the securing features secure the anchoring members to the reinforcing beam.

In one embodiment, one of the anchoring members is a door hinge, and the other anchoring members is a lug. The reinforcing beam extends in a first plane, and the lug extends in a second plane inclined with respect to the first plane. Preferably, the first and second planes are at an angle between 80 and 110°.

The lug can be integrated in one-piece with one of the securing features and is preferably formed by metal deformation of one of the securing features. The reinforcing beam is preferably a metal bar, and the anchoring members are provided at respective ends of the bar.

The anti-side intrusion assembly includes a reinforcing beam running between the two opposing ends of a vehicle door. The door has inner and outer panels. The reinforcing beam is preferably fastened to the inner panel and positioned between the inner and outer panels. One of the anchoring members at the edge of the door carries a lock. A vehicle with a door having this anti-side intrusion assembly is also provided.

Further characteristics and advantages of the invention will become more clear from the detailed description which follows of one embodiment provided solely by way of example and with reference to the attached drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF PREFERRED EMBODIMENT

The present invention provides a vehicle door anti-intrusion assembly 10. The anti-intrusion assembly 10 includes a reinforcing beam 12 and anchoring members 14 and 16 affixed to the reinforcing beam 12 and adapted to anchor the reinforcing beam 12 on the vehicle chassis 24. In the event of a side impact upon the door, the reinforcing beam 12 remains anchored to the vehicle chassis 24 and limits the degree to which the door is pushed inward, protecting the vehicle occupants.

The term chassis herein should be taken to mean the metal structure carrying the vehicle bodywork. It covers not only the base of the vehicle, but also the vehicle frame extending upwardly from the base.

Figure 1:
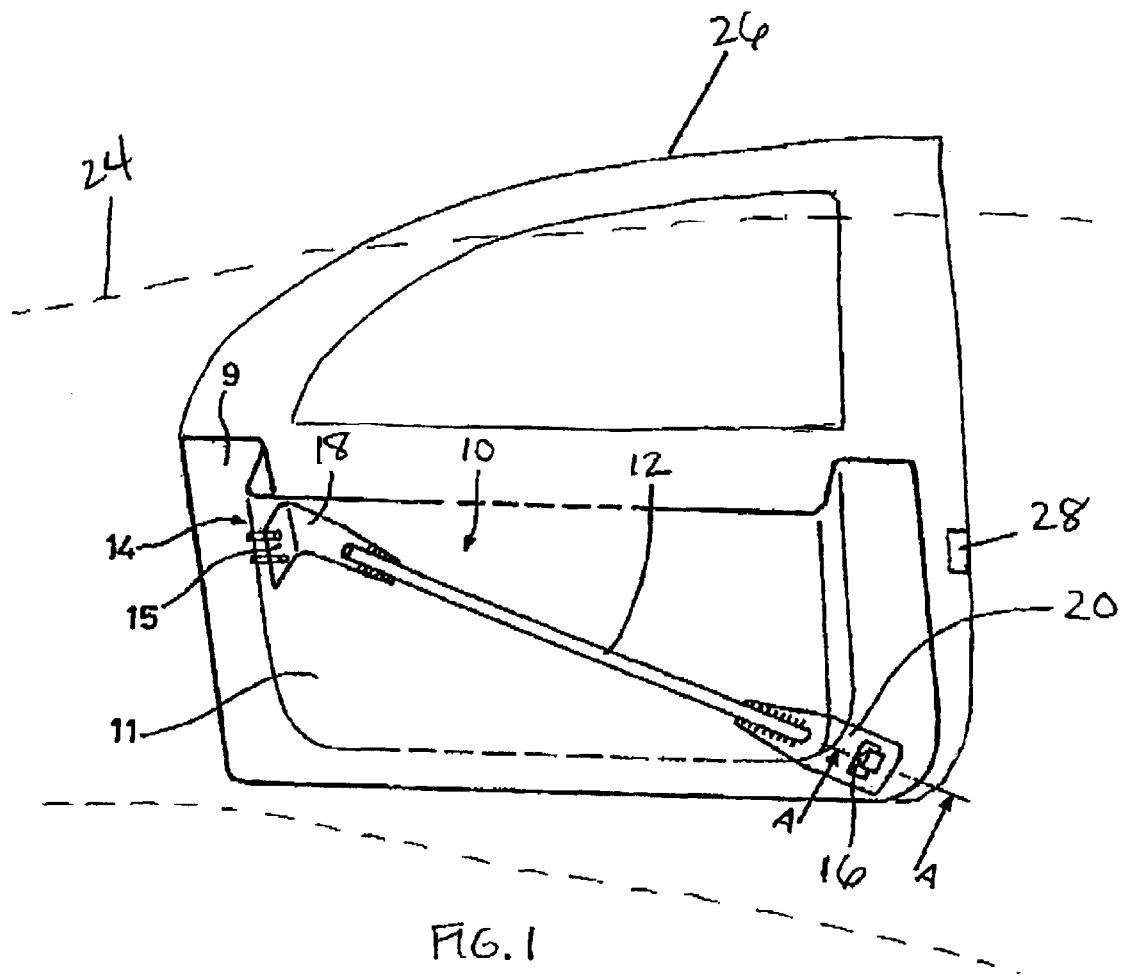
FIG. 1 shows an anti-intrusion assembly according to one embodiment of the invention.

FIG. 1 shows an assembly 10 secured on vehicle inner door panel 9. The assembly 10 includes a reinforcing beam 12 and anchoring members 14, and 16 secured to the reinforcing beam 12 and adapted to anchor the reinforcing beam 12 to the vehicle chassis 24. In the event of a side impact on the vehicle door, the reinforcing beam 12 may deform toward the inside of the vehicle. The reinforcing beam 12 remains anchored to the vehicle chassis 24, limiting deformation of the reinforcing beam 12. In one embodiment, the anchoring members 14 and 16 are fastened to the ends of the reinforcing beam 12.

The inner panel 9 is assembled with an outer panel 26 to form the door. The inner door panel 9 may include a box section 11 in which door equipment, such as a window lifter, is housed.

Vehicle doors are being made lighter by reducing the thickness of the bodywork and by decreasing the size of the door structure, but to reduced weight is to the detriment of the impact resistance of the door. The reinforcing beam 12 of the present invention reinforces the door with minimal encumbrance and little added weight. The reinforcing beam 12 increases vehicle occupant protection against a side impact at the vehicle doors and limits intrusion of the door into the passenger compartment of the vehicle in the event of a lateral impact.

The reinforcing beam 12 extends in the longitudinal direction of the vehicle from one side of the door to the other and extends in a region of the door where there is a high likelihood of the vehicle occupants being potentially injured in the event of a side impact. For example, the reinforcing beam 12 can extend substantially in the longitudinal direction of the vehicle at the height of the occupants' pelvis or be inclined with respect to this longitudinal direction to cover different impact heights in the vehicle door. The reinforcement beam 12 is less bulky and easy to produce.

The reinforcing beam 12 extends in the longitudinal direction of the vehicle from one side of the door to the other and extends in a region of the door where there is a high likelihood of the vehicle occupants being potentially injured in the event of a side impact. For example, the reinforcing beam 12 can extend substantially in the longitudinal direction of the vehicle at the height of the occupants' pelvis or be inclined with respect to this longitudinal direction to cover different impact heights in the vehicle door. The reinforcement member 12 is less bulky and easy to produce.

The reinforcing beam 12 provides greater resistance than the bodywork itself in the event of a side impact. The reinforcing beam 12 lines the door to increase the strength of the door and resists bending. In one example, the reinforcing beam 12 is a shaped member, the inertia of which is greatest in the direction of a side impact. The reinforcing beam 12 has a circular cross section. Preferably, the reinforcing beam 12 is made of metal.

This assembly 10 further includes securing features 18 and 20 to secure the reinforcing beam 12 to the door, and more particulariy to the inner door panel 9 of the door. The securing features 18 and 20 are fastened onto the inner door panel 9. The securing features 18 and 20 and the reinforcing beam 12 can be made in one-piece with a securing feature 18 and 20 at each of the opposing ends of the reinforcing beam 12. The securing features 18 and 20 can also be fastened to the reinforcing beam 12. In one example, the securing features 18 and 20 can be securing plates, and the reinforcing beam 12 is attached to the securing plates by welding.

The anchoring members 14 and 16 are fixed on the reinforcing beam 12 and allow the energy from a lateral impact on the reinforcing beam 12 to be transferred to the vehicle chassis 24. The anchoring members 14 and 16 limit bending of the reinforcing beam 12 under deformation from a side impact. The anchoring members 14 and 16 allow the reinforcing beam 12 to be retained on the vehicle chassis 24, which is stronger than the door, when the door is closed and a side impact occurs. However, the anchoring members 14 and 16 do not hinder opening and closing of the door.

Preferably, one of the anchoring members 14 is a door hinge fixed between the inner door panel 9 and the vehicle chassis 24. The anchoring member 14 anchors the reinforcing beam 12 onto the vehicle chassis 24. When a side impact occurs, the reinforcing beam 12 is held in position at the anchoring member 14. The reinforcing beam 12 can be connected to the anchoring member 14 via the securing feature 18 to fasten the anchoring member 14 to the inner door panel 9 of the door. The anchoring member 14 includes a moving part (not shown) secured to the side of inner door panel 9 and directed towards the passenger compartment of the vehicle. The anchoring member 14 also includes a retaining plate 15 for the moving part secured to the side of the inner door panel 9 directed towards the outer panel 26. The retaining plate 15 is, in one example, inside the box section 11. Therefore, the retaining plate 15, including the anchoring member 14, can be connected to the reinforcing beam 12 via the securing feature 18. The securing feature 18 and the retaining plate 15 can be integrated into a one-piece corner piece. When lateral impact occurs, the reinforcing beam 12 is subjected to a bending force toward the inside of the vehicle, but will remain anchored to the vehicle chassis 24 by the securing feature 18 and the retaining plate 15 of anchoring member 14.

Figure 2:
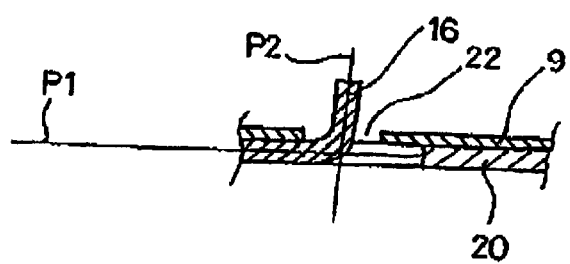
FIG. 2 shows a section along line A—A of the anti-intrusion assembly of FIG. 1.

As shown in FIG. 2, the other anchoring member 16 is a lug extending in a plane P2 different than the plane P1 of reinforcing beam 12. The reinforcing beam 12 extends in a first plane P1 corresponding to the inner door panel 9. The anchoring member 16 extends in a plane P2 inclined with respect to the first plane P1. The anchoring member 16 extends towards the vehicle chassis 24, allowing the anchoring member 16 to engage with the rigid vehicle chassis 24 to counteract bending of the reinforcing beam 12 when a side impact occurs. The anchoring member 16 penetrates into a recess provided in the rigid framework of the vehicle. When a lateral impact occurs, the reinforcing beam 12 is prevented from bending because the anchoring member 16 bears against the rigid sidewall of the recess.

The securing feature 20 is at the end of the reinforcing beam 12 and the anchoring member 16. The anchoring member 16 can be integrated with the securing feature 20 to form a one-piece structure, avoiding an additional step of mounting the anchoring member 16, simplifying production and limiting the total number of parts. The reinforcing beam 12 is fastened against the side of the inner panel 9 directed towards the outer panel 26 of the door. The anchoring member 16 extends through a passage 22 in the inner door panel 9, allowing the anchoring member 16 to anchor the reinforcing beam 12 on the vehicle chassis 24 at the side of the inner door panel 9 directed towards the passenger compartment of the vehicle. The anchoring member 16 projects from the inner door panel 9 towards the vehicle chassis 24. Thus, the anchoring member 16 can anchor the reinforcing beam 12 on the rigid vehicle chassis 24 and prevent the reinforcing beam 12 from bending when a side impact occurs. The anchoring member 16 does not hinder opening and closing of the door. In one example, the anchoring member 16 is 20 mm long.

In one example, the angle between the two planes P1 and P2 is between 80° and 100°. Preferably, the two planes P1 and P2 are substantially perpendicular, allowing the anchoring member 16 to project from the inner door panel 9 and anchor the reinforcing beam 12 on the rigid vehicle chassis 24.

The invention also provides a door including the assembly 10 of the present invention. The door includes an inner panel 9, an outer panel 26, and a box section 11 between the two panels 9 and 26. The reinforcing beam 12 is embedded between the two panels. The assembly 10 is fastened to the inner panel, but extends against the outer panel 26 to limit the space occupied inside the box section 11. The reinforcing beam 12 extends in the plane of the door and between the two opposing ends of the door to extend across the longitudinal direction of the door. The assembly 10 allows the two ends of the reinforcing beam 12 to be anchored to the vehicle chassis 24 to limit bending of the reinforcing beam 12 when subject to a force that is not in a longitudinal direction of the vehicle. In particular, one end of the reinforcing beam 12 can be anchored to the vehicle chassis 24 at the edge of the door supporting the hinges and the other end of the reinforcing beam 12 can be anchored at the edge of the door carrying a lock 28. The door with the assembly 10 protects the vehicle occupants more effectively.

The invention also provides a vehicle with a door including the assembly 10. A recess in the vehicle chassis 24, the sidewall of which cooperates with the anchoring member 16, allows the anchoring member 16 to anchor the reinforcing beam 12 to the vehicle chassis 24 in the event of side impact. The assembly 10 transmits the energy from the impact to the vehicle chassis 24 and protects the vehicle occupants more effectively.

Obviously, this invention is not limited to the embodiments described by way of example. Thus, the number of anchoring members 14 and 16 is not limited to two, but may be higher. Further, the reinforcing beam may be anchored only to the vehicle chassis 24 by the anchoring member 16, allowing the other end of the reinforcing beam 12 to be secured to any location on the door. Also, the reinforcing beam 12 can be anchored by a plurality of anchoring member 16.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An anti-side intrusion assembly for a door of a vehicle, the vehicle having a chassis, the anti-side intrusion assembly comprising:
   a reinforcing beam;
   an inner door panel, with the reinforcing beam fastened against the inner door panel; and
   anchoring members secured to the reinforcing beam, the anchoring members being anchorable on the chassis, wherein one of the anchoring members is a door hinge.

2. The assembly of claim 1, further including a securing feature that secures the reinforcing beam to the inner door panel.

3. The assembly of claim 2, wherein the securing feature secures the anchoring members to the reinforcing beam.

4. The assembly of claim 1, wherein the reinforcing beam extends in a first plane and another of the anchoring members is a lug extending in a second plane inclined with respect to the first plane.

5. The assembly according to claim 4, wherein an angle between the first plane and the second plane is between 80 and 110°.

6. The assembly according to claim 5, further including a securing feature that secures the reinforcing beam to the inner door panel, wherein the lug is integrated into the securing feature.

7. The assembly according to claim 6, wherein the lug extends from the securing feature.

8. The assembly according to claim 1, wherein the reinforcing beam is a metal bar.

9. The assembly according to claim 8, wherein the reinforcement beam includes a first end and an opposite second end, and the door hinge is located at the first end of the reinforcing beam and another of the anchoring members is located at the opposing second end of the reinforcing beam.

10. The assembly according to claim 9, wherein the anchoring member at the opposing second end of the reinforcing beam is a lug.

11. The assembly of claim 1, wherein the reinforcing beam has a circular cross-section.

12. The assembly of claim 2, wherein the securing feature is welded to the reinforcing beam.

13. The assembly of claim 1, wherein the inner door panel includes an opening and another of the anchoring members is a lug, and the lug extends through the opening in the inner door panel.

14. A door panel for a door or a vehicle, the vehicle having a chassis, the door panel comprising:
   an anti-side intrusion assembly including:
      a reinforcing beam for the door,
      an inner door panel with the reinforcing beam fastened against the inner door panel, and
      anchoring members secured to the reinforcing beam, the anchoring members being anchorable on the chassis, and wherein one of the anchoring members is a door hinge.

15. The door panel according claim 14, wherein the door panel includes a first end and an opposing second end, and wherein the reinforcing beam extends between the first end and the opposing second end of the door panel.

16. The door panel according to claim 14, further including an outer panel, the reinforcing beam being fastened to the inner door panel and positioned between the inner door panel and the outer panel.

17. The door panel according to claim 14, further including an edge of the door panel having a lock, and another of the anchoring members is provided at the edge of the door panel.

18. The door panel of claim 17, wherein the inner door panel includes a passage, and another of the anchoring member extends through the passage.

19. The door panel of claim 14, wherein the reinforcing beam has a circular cross-section.

20. The door panel of claim 14, further including a securing feature that secures the reinforcing beam to the inner door panel, and the securing feature being welded to the reinforcing beam.

21. The door panel of claim 14, wherein the inner door panel includes an opening and another of the anchoring members is a lug, and the lug extends through the opening in the inner door panel.

22. A vehicle comprising:
   a chassis; and
   at least one door having an anti-side intrusion assembly, the anti-intrusion assembly including:
      a reinforcing beam,
      an outer door panel, the reinforcing beam being fastened against the inner door panel, and
      anchoring members secured to the reinforcing beam to anchor the reinforcing beam on the chassis, wherein one of the anchoring members is a door hinge.

23. The vehicle of claim 22, wherein the reinforcing beam has a circular cross-section.

24. The vehicle of claim 22, further including a securing feature that secures the reinforcing beam to the inner door panel, and the securing feature being welded to the reinforcing beam.

25. The vehicle of claim 22, wherein the inner door panel includes an opening and another of the anchoring members is a lug, and the lug extends through the opening in the inner door panel.

* * * * *

UNITED STATES PATENT AND TRADEMARK OFFICE
CERTIFICATE OF CORRECTION

PATENT NO. : 6,846,033 B2
DATED : January 25, 2005
INVENTOR(S) : Chu et al.

It is certified that error appears in the above-identified patent and that said Letters Patent is hereby corrected as shown below:

Column 5,
Line 58, "opposite" should read as -- opposing --.

Column 6,
Line 7, "or" should read as -- of --.

Signed and Sealed this

Twenty-sixth Day of April, 2005

JON W. DUDAS
*Director of the United States Patent and Trademark Office*